United States Patent [19]
Kierstead

[11] 3,891,790
[45] June 24, 1975

[54] SPLICING AND REPAIRING INSULATED ELECTRICAL WIRE

[75] Inventor: William L. Kierstead, Newton Centre, Mass.

[73] Assignee: Electronized Chemicals Corporation, Burlington, Mass.

[22] Filed: Mar. 4, 1974

[21] Appl. No.: 447,645

[52] U.S. Cl. ............... 174/93; 174/DIG. 8; 264/272
[51] Int. Cl. .......................................... H02g 15/08
[58] Field of Search .......... 174/84 R, DIG. 8, 77 R, 174/91–93, 74 A; 29/628; 264/272

[56] References Cited
FOREIGN PATENTS OR APPLICATIONS

| 1,149,611 | 4/1969 | United Kingdom............ 174/DIG. 8 |
| 1,177,915 | 4/1970 | United Kingdom............ 174/DIG. 8 |

*Primary Examiner*—Darrell L. Clay
*Attorney, Agent, or Firm*—Russell & Nields

[57] ABSTRACT

In the art of restoring the jacketing and/or insulation of electrical wire, a heat-recoverable sleeve, which is located around the wire and an adhesive disposed therebetween, is heated to form a tightly fitting cover around the wire and to force some adhesive out of the ends of the sleeve so that adhesive beads are formed. The improvement described herein forms a protective cover for the end of the sleeve and the adhesive bead and shapes the bead in a controlled manner. A heat-recoverable tube is positioned around the bead at one end of the sleeve, the tube having a length sufficient to cover the wire and the end of the sleeve which are adjacent to the bead. The tube is heated, and as it shrinks in response to the heat, the tube forms a tightly fitting cover around the junction of the sleeve and the wire and compresses the adhesive bead so that the bead has a concave external profile. This compression on the bead extends the adhesive contact of the bead along the wire in an axial direction and along the side edge of the sleeve in a radial direction.

5 Claims, 12 Drawing Figures

PATENTED JUN 24 1975 3,891,790

SHEET 1

3,891,790

SPLICING AND REPAIRING INSULATED ELECTRICAL WIRE

BACKGROUND OF THE INVENTION

The present invention relates to a device for strain dissipation, adhesive barrier control, and protection of the extremities of splice and repair sleeves used in combination with flexible, insulated electrical wire. As used herein, "wire" includes any electrical conductor, such as wire and cable, covered by insulation or jacketing.

The use of heat-recoverable sleeves for the restoration or repair of the insulation or jacketing of flexible electrical wire is well known and widely practiced. As used hereinafter, the term "insulation " is intended to refer either to the insulation or to the jacketing. Also known is the use of heatrecoverable sleeves for the purpose of strain relief of flexible electrical wire used in conjunction with electromechanical items, such as electrical connectors. In both instances of application, a heat-recoverable sleeve is installed in close mating contact around the portion of the wire requiring insulation by heating the sleeve after the sleeve is properly located around the wire portion to be covered. The sleeve usually remains in close mating contact with the electrical wire if the wire is maintained in the straight orientation which existed at the time of installation of the sleeve. However, when the wire is flexed, mechanical forces are created at the interface of the sleeve and the wire. These forces may disrupt the mating contact between the sleeve and the wire at the ends of the sleeve which are opposite the direction of flexing. The loss of mating contact may be only temporary in that it occurs only when the assembly is flexed. However, the continued flexing of the wire may cause permanent loss of mating contact and permanent deformation of the sleeve.

The loss of mating contact between the ends of the sleeve and the electrical wire is not desirable in applications where the ingress of foreign substances, such as moisture or other foreign liquid or solid materials, into the assembly must be avoided. Furthermore, when the assembly is flexed continuously, the ingress of foreign substances into the assembly is hastened due to the continual relative motion of the interfaces of the assembly. In this circumstance the intended purpose of the assembly is rapidly defeated because the purpose of the sleeve is to protect and/or insulate the electrical wire it surrounds.

In an attempt to enhance the effectiveness of the heatrecoverable sleeve method of repairing electrical wire, these sleeves are often used in combination with a material, such as a mastic, encapsulant or adhesive. For the purpose of this disclosure, these materials are referred to as an adhesive. These adhesives, which are ordinarily of a heat-softenable or heat-meltable nature, are applied at the interface of the sleeve and the portion of the electrical wire which the sleeve surrounds. The intended purpose of the adhesive is to exclude foreign substances from the assembly, thereby providing water-tightness, moisture proofing, or complete sealing of the assembly.

The adhesives used in combination with the sleeve are ordinarily of low tensile strength at room temperature and of significantly lower tensile strength at elevated temperatures than the tensile strength of the materials with which they are used in combination. In an assembly utilizing an adhesive, the same mechanical forces, as previously described, exist when the assembly is flexed. When an assembly incorporating such an adhesive is flexed, the forces created may be sufficient either to break the adhesive bond at the extremity of the sleeve or to elongate the adhesive so that its surface integrity is disrupted. Either result allows foreign substances into the assembly. Additionally, when the assembly is continuously flexed under these conditions, enough foreign substance may enter the assembly to defeat its intended purpose. Some applications for a flexible, insulated electrical wire present a great tendency for foreign substances to enter the sleeve assembly; a typical example is a portable electrical cable which is in moving contact with the earth or other objects.

In an attempt to overcome the above-described difficulties which are widely encountered with sleeve assemblies utilizing an adhesive, an excess of adhesive is applied to the assembly so that the adhesive flows freely from the ends of the sleeve when the sleeve is installed, thereby forming an adhesive "bead" at the junction of the ends of the sleeve and the wire. The apparent intended purposes of the adhesive bead are generally accepted to be:

1. to ensure that the adhesive is properly melted at the time of installation of the sleeve;
2. to provide a physical barrier against the intrusion of foreign substances into the completed assembly;
3. to form a conforming "rubber-band" seal at the ends of the sleeve to maintain the integrity of the adhesive seal at the outer edge of the ends of the sleeve; and
4. to provide additional integrity to the adhesive seal by extending the interface of the adhesive and its underlying substance beyond the ends of the sleeve.

In practice, the efficacy of the sleeve installed with an adhesive, both with and without the bead seal, is inadequate. The adhesive still separates from the material it is intended to adhere to in the area of the junction of the ends of the sleeve and the electrical wire. As a result, foreign substances may enter into the assembly and defeat the intended purpose of the sleeve assembly. Additional, but generally unsuccessful, attempts to eliminate these problems include improving or revising the adhesive substances used with the sleeves and changing the flexibility characteristics or geometrical configuration of the sleeves.

SUMMARY OF THE INVENTION

According to the present invention, an improved covered electrical wire is provided in which heat-recoverable tubes are used to shape the adhesive beads at the ends of the heat-recoverable sleeve. The heat-recoverable sleeve is located around a portion of the wire, and the sleeve is in a heat-recovered state to provide mating contact with the wire. Before the sleeve is heat-recovered, an adhesive material is applied to the interface of the inner surface of the sleeve and the wire it surrounds, the adhesive material being workable at elevated temperatures which cause recovery of the sleeve and forming adhesive beads at the ends of the sleeve. A heat-recoverable tube is located around the end of the sleeve and has a sufficient length to surround a segment of the wire as well as a segment of the sleeve. When the tube is heated, the tube shrinks and compresses the adhesive bead against the sleeve and wire so that the adhesive bead is bonded to the edge of the sleeve and the wire. The compression shapes the bead so that it has a concave external profile.

The use of the heat-recoverable tube in conjunction with an adhesive offers several advantages. The concave outer shape of the adhesive bead significantly reduces the tendency of the forces acting on the bead during flexing of the wire to separate the bead from the sleeve end or the wire. Also, the pressure exerted on the softened adhesive bead by the shrinking tube forces the adhesive to make complete contact with the edge of the sleeve throughout its thickness dimension. This condition enhances the effectiveness of the use of the adhesive to seal the junction of the end of the sleeve and the electrical wire. Also, the sleeve extends the coverage of the adhesive over the electrical wire. Similarly, the compression exerted by the tube improves wetting of the material to which adhesion is desired. Furthermore, the tube prevents contact of the adhesive with physical objects, and therefore the adhesive bead is protected against damage, deformation or tearing.

The tube also inhibits foreign material from entering the extremities of the sleeve used on a flexible, electrical wire. Another advantage resides in the ability of the heat-recoverable tube of the present invention to dissipate or minimize the strain at the junction of the end of the sleeve and the electrical wire due to flexing of the wire. In many applications the electrical wire is flexed. Without the heat-recoverable tube, the sleeve portion of the wire is much less flexible than the remainder of the wire. Thus, when the wire is flexed, the radius of curvature of the sleeved portion of the wire is greater than that of the electrical wire immediately adjacent to the sleeve junction. As the wire is flexed, forces are created which separate the sleeve from the electrical wire at the junction. The strain is concentrated at the junction. The heat-recoverable tube which tightly covers the junction dissipates the strain or reduces its concentration at the junction, thereby preventing the sleeve from separating from the wire. The tube reduces the flexibility of the electrical wire adjacent to the junction. This in turn reduces the strain at the junction because the radius of curvature of the sleeved protion of the wire and the wire immediately adjacent to the junction are more nearly similar.

BRIEF DESCRIPTION OF THE DRAWINGS

For a better understanding of the invention, reference may be made to the following descriptions of the exemplary embodiments taken in conjunction with the following drawings, in which.

DESCRIPTION OF PREFERRED EMBODIMENTS

PRIOR ART

Figure 1:
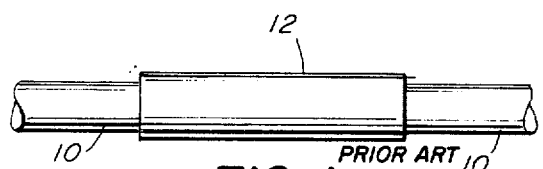
FIG. 1 shows a known use of a heat-recoverable sleeve for covering a portion of an insulated electrical wire.

Referring to the drawings, FIGS. 1 to 7 show prior art techniques for repairing the insulation on an electrical wire. FIG. 1 shows a portion of a length of insulated electrical wire 10. A heat-recoverable sleeve 12 is disposed around a portion of the wire 10. The sleeve 12 is shown in its recovered state in which it s in tight mating contact with the wire 10. The purpose of the sleeve 12 is to restore or repair the insulation of the wire 10.

Figure 2:
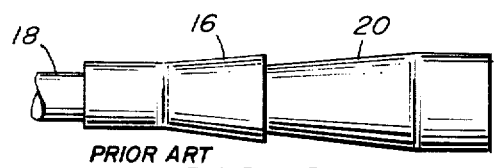
FIG. 2 shows another known use of a heat-recoverable sleeve for covering the junction of an electrical connector and an electrical wire.
Figure 3:
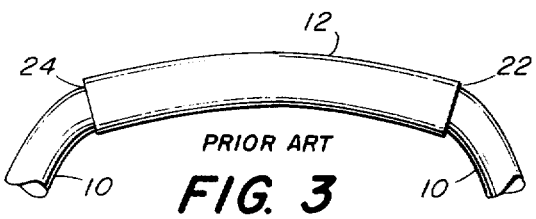
FIG. 3 shows the electrical wire and sleeve of FIG. 1 in a flexed orientation and indicates the variation in the radius of curvature between the segment of the electrical wire surrounded by the sleeve and the electrical line adjacent to the sleeve.
Figure 7:
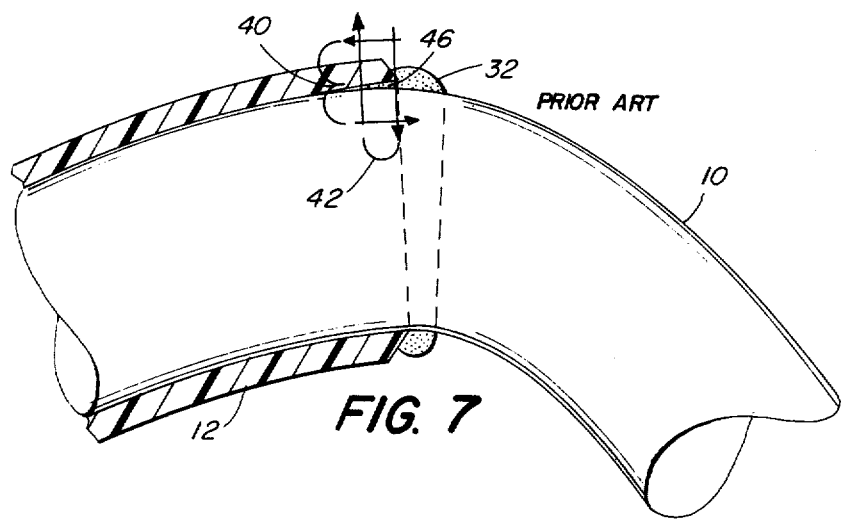
FIG. 7 shows the differential forces acting on the sleeve when the wire is flexed.

While in some of the figures the ends of the sleeve 12 are formed at an angle of 90° with respect to the longitudinal axis of the sleeve, the ends of the sleeve may be chamfered or finished at an angle, such as shown in FIG. 7. The need to insulate a portion of the wire 10 by the sleeve 12 may be created by damage to the wire wherein the insulation is removed or by splicing one or more wires wherein some insulation has been intentionally removed. The sleeve 12, in its unrecovered state, is located around the portion of the wire 10 requiring insulation. Then the sleeve 12 is heated, such as by a blow torch, thereby causing the sleeve to shrink. Fig. 2 shows the use of a heat recoverable sleeve 16 for providing strain relief of a flexible electrical wire 18 at its junction with an electrical connector 20. FIG. 3 demonstrates the problem with the known sleeve arrangement shown in FIG. 1. When the electrical wire is flexed as shown in FIG. 3, the sleeve 12 tends to separate from the electrical wire 10 at the ends of the sleeve which are on the opposite side of the wire from the center of the radius of curvature of the flexed wire. The locations of the separation of the sleeve 12 from the wire 10 are indicated by the numerals 22 and 24. The separation is created by the variation in the rate of curvature of the wire covered by the sleeve and the wire adjacent to the sleeve. As shown in FIG. 3, the wire adjacent to the sleeve flexes a greater amount than the wire covered by the sleeve due to the stiffness added by the sleeve.

Figure 4:
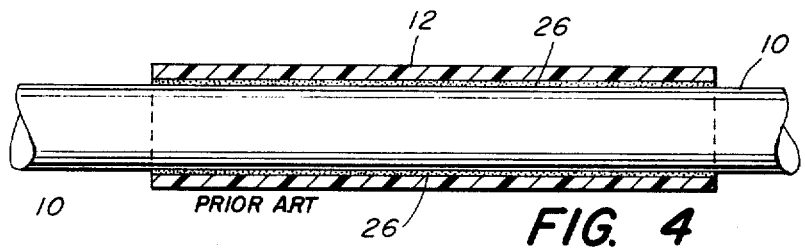
FIG. 4 shows in cross section a known arrangement of a sleeve an adhesive for covering a portion of an electrical wire.
Figure 5:
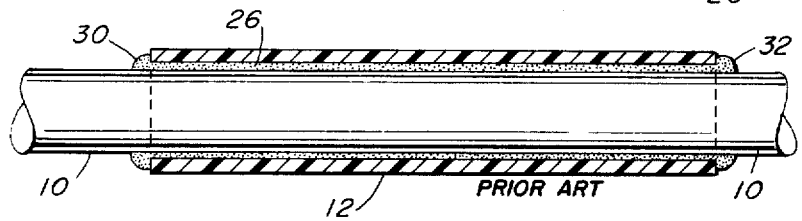
FIG. 5 shows in cross section the known formation of adhesive beads at the ends of the sleeve.

In FIG. 4, an adhesive material 26 may be coated on the interface of the sleeve 12 and outer surface of the wire 10. The adhesive may be coated on the inner surface of the sleeve or on the outer surface of the portion of the wire to be covered by the sleeve or the adhesive may be coated on both surfaces. The adhesive material aids in preventing loss of contact between the wire 10 and the sleeve 12. It is also known as shown in FIG. 5 to apply enough adhesive 26 so that a pair of adhesive beads 30 and 32 are formed when the sleeve 12 is in a heat-recovered state. The purpose of the beads is to aid in preventing foreign matter from coming between the recovered sleeve 12 and the electrical wire 10.

FIG. 7 shows in more detail now the bending of the wire 10 as in FIG. 3 causes the sleeve 12 to separate from the wire 10. In a typical assembly where the sleeve 12 is installed in combination with an insulated, flexible electrical wire 10, the flexibility of the portion of the wire where the sleeve is installed is usually significantly less than that of the wire itself. Greater pressure is required to deflect a given length of the sleeved wire a given distance than is required to deflect a similar length of wire a similar distance. Therefore, when such a wire which incorporates a sleeve is freely flexed, the radius of curvature of the sleeve portion is always greater than that of the remainder of the wire. Several mechanical phenomena result from such bending or flexing. A differential shear force shown by the arrows 40 is developed at the interface of the inner surface of the sleeve 12 and adhesive 26 and the outer portion of the wire 10 that is surrounded by the sleeve and adhesive. This force is mainly stabilized within the assembly due to the mechanical enclosure strength of the sleeve 12 and to the action of the adhesive 26. However, at the extremities of the sleeve in the area of the junction of the sleeve 12 and the wire 10, the effect of the shear forces is pronounced; the outer surface of the wire 10 external to and directly adjacent to the sleeve 12 stretches to a greater degree than the sleeve surface directly adjacent to it. Thus, the adhesive 32 in this area is either elongated due to its low tensile strength or the adhesive bond at the interface of the inside surface of the sleeve 12 or at the external surface of the wire is broken due to the fact that the shear force resulting from bending is greater than the shear strength of the adhesive bond. Also, with such assemblies, the compressive force shown by arrows 42 (peel force) required to deform the wire at the junction of the sleeve end and the wire directly adjacent is significantly greater than the ability of the sleeve to withstand such force. Thus, an area 46 of the sleeve 12 separates from mating contact with the surface of the wire 10 it covered prior to flexing. Where an adhesive exists at the interface of these two surfaces, the adhesive is either stretched or its adhesive bond is broken. The peel force involved, either of itself or in combination with the earlier cited shear force, is greater than the adhesive peel strength to either the surface of the sleeve or to the surface of the wire.

Figure 6:
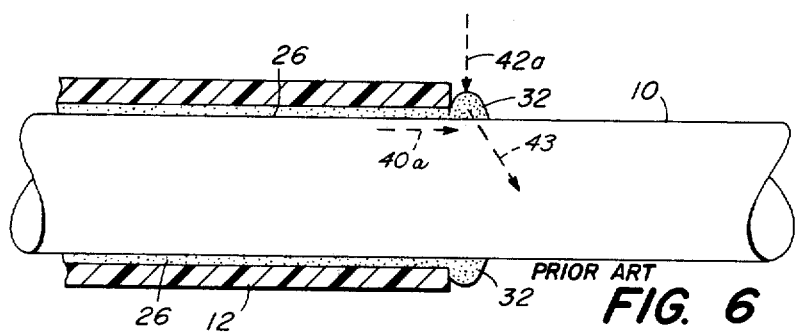
FIG. 6 shows the forces exerted on the adhesive beads of the arrangement in FIG. 5.

Another problem with the prior art use of adhesives is described below in conjunction with FIG. 6. The installation of the sleeve 12 in combination with an adhesive 26 has its best effectiveness when the adhesive bead 32 forms at the outer edge of the sleeve 12. However, the desired effect and results are not always achieved in practice for the following reasons. The adhesive is allowed to melt and flow freely, without constraint or control, from the ends of the sleeve, resulting in wide variations in volume of adhesive flow, the bead size and configuration, and the distance of flow of the adhesive. There are also variations in installation procedures by the user. The degree of heat applied to the various components during installation is uncontrollably varied. Also, there are variations in the skill of individuals installing the assembly. Another problem is the contact of the exposed adhesive bead 32 with physical objects. Since the adhesive is of low tensile strength, such physical contact can cause damage, deformation or tearing of the adhesive or cause its lifting from the material to which it is bonded. Also, the optimum bond strength of the adhesive, particularly with higher viscosity adhesives such as those described as thermoplastic types, is not achieved when the adhesive is allowed to flow freely from the ends of the sleeve and then cooled as it resides on the surface of the wire. Additionally, the optimum adhesive configuration consistent with the principle involved is not achieved with the adhesive bead method of installation. With the bead configuration, the resultant force 43 due to flexing, which includes the peel force 42a and the shear force 40, is translated through the adhesive bead and to the surface of the material to which it adheres. The greatest effect is created by the peel force 42a which tends to pull the wire downward and away from the thick adhesive bead.

PREFERRED EMBODIMENTS

Figure 8:
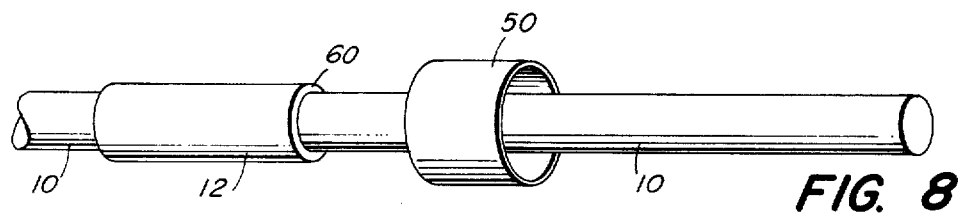
FIG. 8 shows the partial installation of a heat-recoverable tube in accordance with the present invention for use in conjunction with the heat-recoverable sleeve and electrical wire previously shown.
Figure 9:
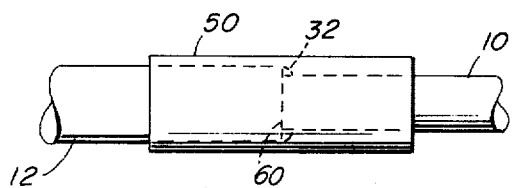
FIG. 9 shows the proper position of the heat-recoverable tube of the present invention with respect to the sleeve and the electrical wire prior to heat recovery.
Figure 10:
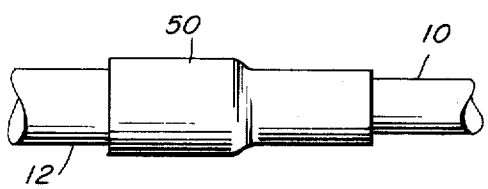
FIG. 10 shows the arrangement of FIG. 9 after the tube is in a heat-recovered state.

The preferred embodiment of the present invention is shown in FIGS. 8 to 12. In FIG. 8 there is shown the electrical wird 10 and the sleeve 12 previously shown in FIGS. 1 to 7. In accordance with the invention, a heat-recoverable tube 50 is used and is shown being located around the wire 10. The tube 50 is preferably made of an irradiation cross-linked polyolefin compound. As shown in FIG. 9, the tube 50 is positioned over one junction 60 of the electrical wire 10 and one end of the sleeve 12. Then the tube 50 is heated; the tube shrinks and forms the assembly shown in FIG. 10. The tube 50 may be recovered by heating the tube with a propane torch or any heat source capable of delivering about 250°F.

The invention consists of a length of a heat-recoverable tube of an internal diameter sufficiently large so as to allow location of the tube over an extremity of the sleeve 12. The external dimensions of the sleeve and the wire and the shrinkability of the tube is such that when the tube recovers it completely and tightly surrounds the extremity of the installed sleeve as well as the wire. The thickness of the tube wall, preferably, is of such a nature that, upon its recovery over the installed assembly, the tube thickness will be sufficient to provide the desired degree of stiffness and strength. As an example, the wall thickness of a tube to be used for a sleeve assembly installed over a typical two-conductor, flat, portable insulated electrical cable with 4 AWG size electrical conductors is 0.020 inches.

In the preferred embodiment, one-half of the length of the tube 50 covers the wire 10 adjacent to and exterior to the installed sleeve 12, while the other half covers the sleeve 12.

The length of the tube varies with respect to the overall length of the installed sleeve and the tube length is selected to accommodate the individual assembly size as well as to achieve the desired effects. As an example, for a typical sleeve assembly as is installed in portable insulated electrical cables, such as Type G or Type W cables, the length of the tube is approximately one-sixth that of the sleeve.

The tube, being located over tthe installed sleeve assembly in the manner described above, is recovered to a tight fit over the sleeve end and the electrical wire adjacent to and exterior to the sleeve end. The assembly is then allowed to cool to ambient temperature, and it is then in a condition to be placed in service.

Figure 11:
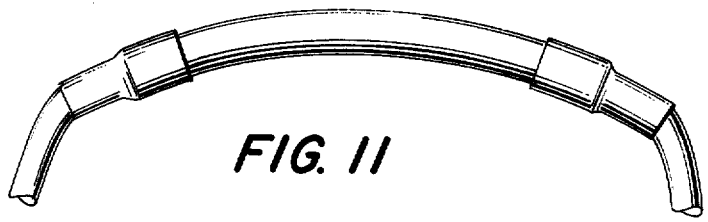
FIG. 11 shows the repaired electrical wire according to the invention in a flexed orientation.
Figure 12:
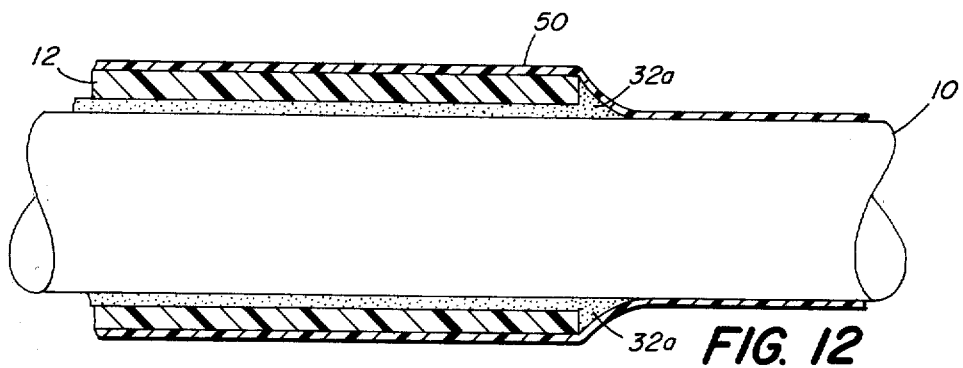
FIG. 12 shows in detailed cross section the arrangement of the present invention.

FIGS. 11 and 12 show how the present invention overcomes the problems described with reference to FIGS. 6 and 7.

It has been found that the phenomena and effects described do not exist if the forces due to flexing of the wire that are translated to the sleeve, adhesive and the wire do not exist. By making the radius of curvature of the wire at the area of the extremities of the installed sleeve closely similar to the radius of curvature of the sleeve assembly when the wire is flexed, the above-named mechanical phenomena and their effects are minimized. My invention causes such a desirable condition because the tube 50 lends stiffness and strength to the wire beyond the sleeve junction.

Another advantage of the present invention resides in the effect of the tube 50 on the adhesive bead. With the application of the tube 50 over the area of the adhesive bead. With the application of the tube 50 over the area of the adhesive bead 32, sufficient heat is transferred to the bead 32 to cause it to soften or melt. The tube 50, which has perfect elastic memory, surrounds the softened or melted adhesive, thereby containing and compressing the bead uniformly. The adhesive is thereby molded against the surfaces at the junction of the sleeve and the wire directly adjacent to and exterior to it. The resulting adhesive configuration is of concave section, as in FIG. 12, and is gradually tapered to a thin edge around the surface of the wire. As a result of the convave surface of the adhesive, the translation of peel forces due to flexing of the installed sleeve assembly and its associated wire are minimized. Such forces are resolved as bending forces rather than as peel forces. Secondly, the above-described molding of the melted or softened adhesive by the tube forces the adhesive to make complete contact with the overall edge area of the sleeve throughout its total thickness to the extent the edge is overlapped by the adhesive, a beneficial condition not accomplished with prior methods because the softened adhesive makes contact with such surfaces in a limited and uncontrolled way due to dependence on the capillary flow of the adhesive to make such contact. Thirdly, the compressive force of the tubing on the softened or melted adhesive during the application of the invention significantly improves the adhesion of the adhesive to the material it contacts because the application of such force causes significantly improved wetting of the material to which adhesion is desired. Fourthly, because the adhesive at the extremities of the tubing, as well as the tubing ends themselves, is covered by the installed tubing, the adhesive cannot be directly contacted by physical objects and is therefore protected against damage, deformation, or tearing as previously described. Also, the tube extends the coverage of the adhesive on the wire but in a controlled fashion. Thus, the present invention provides a means of displacing and molding the adhesive in a beneficial and controlled manner.

The following describes the method of forming the improved protective cover according to the present invention. An adhesive material is disposed around the portion of the wire to be covered, and the heat-recoverable sleeve is located around the wire portion and the adhesive. There are several suitable ways of accomplishing these steps. For example, the adhesive may be applied directly to the wire. Also, the adhesive may be in the form of a tape which is wrapped around the wire, or the adhesive may be pre-coated on the inner surface of the heat-recoverable sleeve before the sleeve is located around the wire. Thus, the method contemplates any sequence of steps which result in the arrangement of an adhesive material disposed between the outer surface of the wire to be covered and the inner surface of the sleeve. The sleeve is then heated so that the sleeve shrinks to form a tihtly fitting cover around the wire. The shrinking of the sleeve also forces some adhesive which is workable at the heat-recovery temperature of out sleeve to flow our of the ends of the sleeve to form adhesive beads. It has been found preferable for the proper formation of the beads to heat the center of the sleeve first and then to heat the sleeve outwardly to one end and then to the other end. A heat-recoverable tube is then positioned over the adhesive bead at one end of the sleeve, the tube having a length sufficient to cover the sleeve and wire which are adjacent to the bead. The tube is then heated so that the tube shrinks to form a tightly fitting cover around the junction of the end of the sleeve and the wire. Furthermore, the heated tube compresses the adhesive bead, originally having a generally convex external profile, so that it now has a concave external profile. This compression on the bead extends the length of the bead in an axial direction along the wire and extends the length of the bead in a radial direction along the thickness of the edge of the sleeve. It has been found to be important to heat the portion of the tube wich surrounds the sleeve first, then, the central portion of the tube which surrounds the bead and lastly, the tube portion which covers the wire itself. This sequence of heating the tube provides the best reliability in shaping the bead in the above-described controlled fashion.

The embodiments of the present invention described previously are intended to be merely exemplary and those skilled in the art will be able to make numerous variations and modifications without departing from the spirit of the present invention. All such variations and modifications are intended to be in the scope of the invention as defined in the appended claims.

What is claimed is:

1. An improved, covered electrical wire comprising in combination:
   a. an electrical wire;
   b. an adhesive material which is workable at elevated temperatures disposed around a portion of the electrical wire;
   c. a heat-recoverable sleeve disposed around the adhesive material and the wire portion, said sleeve being shrunk around the wire portion and forcing some of the adhesive to flow out of the ends of the sleeve and forming an adhesive bead thereat; and
   d. two heat-recoverable tubes one disposed over each of the adhesive bead at each end of the sleeve, each tube extending around a segment of the sleeve and a segment of the wire which are adjacent to the bead each tube being heat shrunk forming a tight-fitting cover around the end of the sleeve and compressing and shaping the adhesive bead to enhance its adhesive contact with the wire and the edge of the sleeve.

2. The improved, covered electrical wire according to claim 1 wherein the bead has a concave external profile and has extended contact with the wire along an axial direction.

3. The improved, covered electrical wire according to claim 2 wherein the bead has extended contact with the edge of the sleeve along a radial direction.

4. A method of forming a protective cover on a portion of an electrical wire comprising the following steps:
   a. disposing an adhesive material which is workable at elevated temperatures around that portion of the wire which is to be covered;
   b. disposing a heat-recoverable sleeve around the adhesive and said wire portion;
   c. heating the sleeve causing the sleeve to shrink tightly around the wire forming a protective covering on the wire and forcing some adhesive out of the ends of the sleeve forming an adhesive bead at each end of said sleeve;
   d. placing a heat-recoverable tube around the adhesive bead at each end of the sleeve, each tube extending around a segment of the sleeve and a segment of said wire which are adjacent to the bead; and
   e. heating each tube causing each tube to shrink forming a tightly fitting cover around the end of the sleeve and compressing and shaping the bead enhancing the adhesive bond between the end of the sleeve, the wire and the bead.

5. The method according to claim 4 wherein the step of heating each of the tubes includes the steps of: first,
   a. heating the portion of the tube which surrounds the end of the sleeve, then,
   b. heating the central portion of the tube which surrounds the bead, and then
   c. heating the portion of the tube which surrounds the wire adjacent to the bead.

* * * * *